April 25, 1972   H. L. BAKER   3,658,977
METHOD AND APPARATUS FOR SCREEN MOLDING
THREE-DIMENSIONAL OBJECTS
Filed March 12, 1969   2 Sheets-Sheet 1

INVENTOR
Harold L. Baker

BY Schmidt, Johnson, Hovey,
Williams & Chase.
ATTORNEYS

INVENTOR
Harold L. Baker

BY Schmidt, Johnson, Hovey,
Williams & Chase.
ATTORNEYS.

United States Patent Office 3,658,977
Patented Apr. 25, 1972

3,658,977
**METHOD AND APPARATUS FOR SCREEN MOLD-
ING THREE-DIMENSIONAL OBJECTS**
Harold L. Baker, Kansas City, Mo., assignor to
Rayette-Faberge, Inc., New York, N.Y.
Filed Mar. 12, 1969, Ser. No. 806,419
Int. Cl. B29c 15/00; B29d 9/08
U.S. Cl. 264—130
17 Claims

ABSTRACT OF THE DISCLOSURE

Three-dimensional objects are molded by advancing a special squeegee member along a flexible screen or the like to which a perforated mold is affixed, and pressing the mold into progressive engagement with a substrate, while at the same time, causing the squeegee to force the molding material through the screen and into the mold cavity, the mold stripping automatically and cleanly from the deposited material behind the squeegee as it is advanced.

---

It is an important object of my present invention to provide a novel molding method which will permit production in a somewhat assembly line fashion of a three-dimensional article in successive molding operations within a period of time that is only slightly greater than that required to pour the molding material into the mold.

Another important object of the instant invention is the provision of a method for rapid and economical production of multilayer articles in a manner to produce various designs and configurations by chemical bonding of the layers one to another.

Still another important object of my instant invention is to produce molded articles by progressive building up of successive layers which will permit formation of various designs and configurations of different colors.

A further object of the present invention is to provide for rapid, automatic removal of the mold from the molded article in a manner to shear the edges of the molding material prior to final cure, thereby completely eliminating the need for secondary fabrication.

Another aim of the present invention is to attain intricate design and detail on the article of manufacture to an extent previously deemed impossible in conventional molding procedures and equipment.

Figure 1:
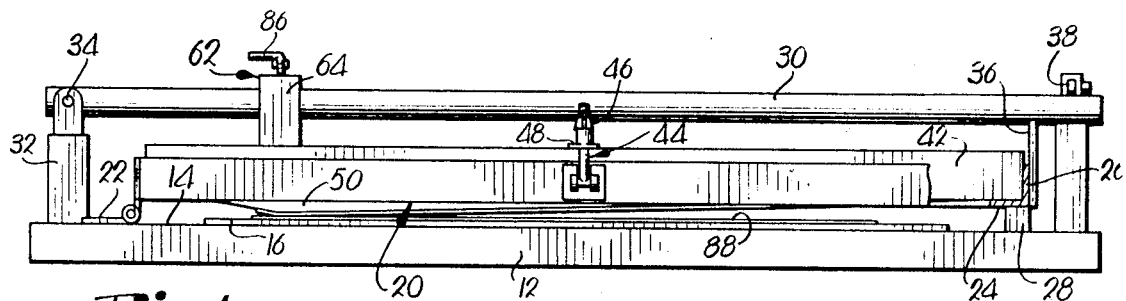
FIG. 1 is a side elevational view of apparatus for screen molding of three-dimensional objects made in accordance with my present invention and capable of use in carrying out my novel method, parts being broken away for clearness.
Figure 2:
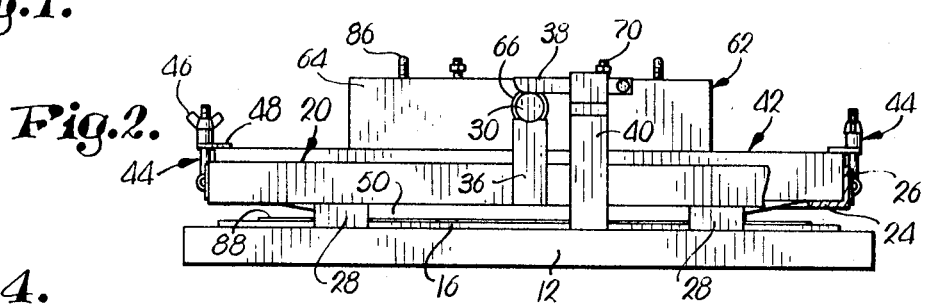
FIG. 2 is an end elevational view of the apparatus illustrated in FIG. 1, parts being broken away and in section to reveal details of construction.

In FIGS. 1 and 2 of the drawings, the molding apparatus as illustrated includes a suitable supporting base 12, horizontally disposed and having a flat uppermost surface 14 adapted to support a vacuum board 16, provided with a plurality of openings 18 (FIGS. 5 and 6) for purposes to hereinafter be made clear.

The top surface 14 of the base 12 also supports an open frame 20 through the medium of a plurality of hinges, one of which is illustrated in FIG. 1 and designated by the numeral 22. It is noted in FIGS. 1 and 2 the four sides of the polygonal frame 20 are made from angle iron or the like presenting horizontal and vertical legs 24 and 26 respectively, the legs 24 being in turn supported by blocks 28 remote from hinges 22 to maintain the legs 24 in substantial parallelism with the surface 14 of base 12.

That end of the frame 20 remote from hinges 22 is held tightly against the blocks 28 by an elongated arm 30 extending longitudinally of the frame 20 thereabove and mounted on the base 12 through the medium of a standard 32 secured to base 12 and extending upwardly from the latter adjacent the hinges 22. The transversely circular arm 30 is swingably attached at one end thereof to the standard 32 by a pivot pin 34 and the opposite end of the arm 30 bears against an upwardly extending bar 36 rigidly secured to leg 26 at that end of the frame 20 opposite to hinges 22.

The arm 30 is releasably held in the position shown in FIGS. 1 and 2, holding the frame 20 against the blocks 28 by a horizontally slidable latch 38 carried by a post 40 that is in turn secured to and extends upwardly from the face 14 of base 12.

Figure 7:
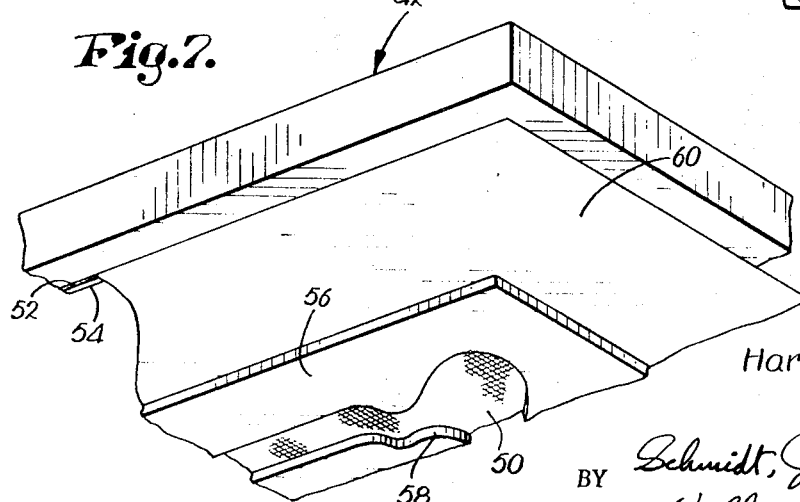
FIG. 7 is an enlarged fragmentary perspective view of a portion of the mold, its flexible support and the mounting frame.

A second, open, polygonal frame 42 (see also FIG. 7) is removably disposed within the confines of frame 20 resting on legs 24 and held in place by a plurality of releasable clamps 44 swingably mounted on the outer faces of the legs 26 of frame 20. Each clamp 44 is provided with a bolt and wing nut arrangement 46 adapted to maintain lateral extensions 48 in tight engagement with the frame 42 thereabove.

The frame 42 has a flexible member 50 secured to the normally lowermost face of frame 42 within grooves 52 in full covering relationship to the innermost polygonal opening 54 that is defined by the continuous frame 42.

The member 50 has a stencil mold 56 bonded or otherwise affixed to its normally lowermost face, mold 56 being in turn provided with a perforation 58 of any desired configuration, depending upon the shape and size of the molded article to be produced by the apparatus and method of my invention.

The member 50 may, if desired, be imperforate throughout except at the perforation 58, at which zone the member 50 may be provided with an opening of a size and configuration conforming to the shape and size of the perforation 58.

Alternately, the member 50 may be in the form of a screen of a desired mesh, as illustrated, with all portions of member 50 except at perforation 58 blocked off with a suitable coating 60. In its normal, at rest position the member 50 should be maintained relatively taut across the opening 54 in the frame 42.

Figure 3:
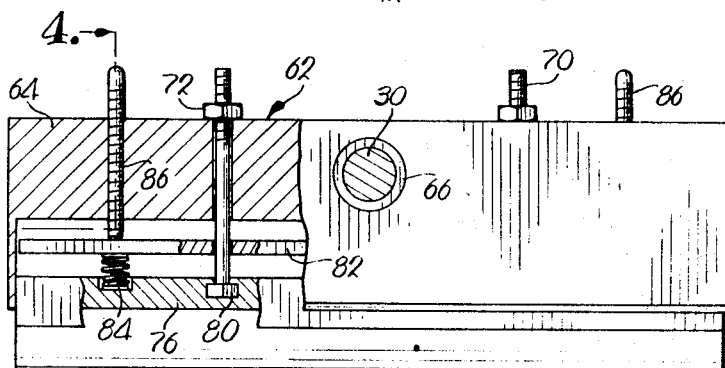
FIG. 3 is an enlarged end view of the squeegee assembly, showing its arm support in section, parts being broken away and in section for clearness.

A squeegee assembly broadly designated by the numeral 62 (also shown in FIGS. 3 and 4) is supported by the arm 30 for reciprocation therealong above the member 50 and within the confines of the opening 54 in frame 42. Assembly 62 includes an elongated block 64 having a length at least as wide as the mold 56 or, if desired, somewhat shorter than the width of the mold 56 provided that block 64 is as long as the maximum width of the perforation 58. As seen in FIGS. 2 and 3, the block 64 is provided with a sleeve 66 thereacross which receives the arm 30.

Block 64 has a squeegee element 68 suspended therefrom through the medium of a plurality of bolts 70 extending loosely through the block 64 and provided with nuts 72 for adjustment of the extent of movement of the squeegee 68 downwardly away from the block 64.

The squeegee 68 is essentially in the nature of an elongated rigid cylinder except only for the provision of a longitudinally extending, transversely arcuate rib 74 on the lowermost surface of the squeegee 68. It is to be preferred that squeegee 68 be coated with a suitable resilient material such as rubber.

Squeegee 68 has an elongated longitudinally extending guide bar 76 affixed to its uppermost surface and shiftable vertically within the confines of a downwardly facing cavity 78 formed in the block 64. Heads 80 of bolts 70 are permanently embedded within the bar 76 as shown in FIG. 3.

Cavity 78 also receives an elongated plate 82 which loosely receives the bolts 70. A plurality of coil springs 84 are interposed between the bar 76 and the plate 82, and a number of adjustable L-shaped stops 86 carried by the block 64 limit the extent of upward movement of the plate 82 within cavity 78.

Figure 5:
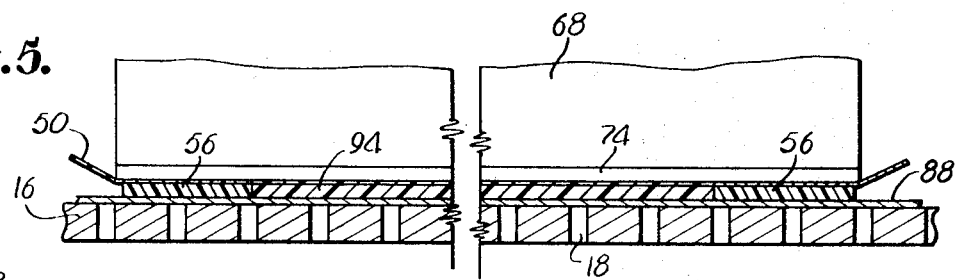
FIG. 5 is a vertical, enlarged fragmentary cross-sectional view through the apparatus illustrated in FIGS. 1 and 2 illustrating the action of the squeegee in placement of the molding material into the mold and on to the substrate.
Figure 6:
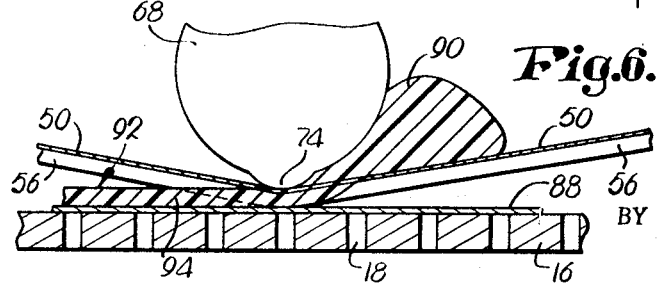
FIG. 6 is an enlarged fragmentary cross-sectional view showing the vacuum board as in FIG. 5, the substrate, the mold, and the flexed screen as the squeegee acts thereon and deposits the material onto the substrate.

The board 16 as best seen in FIGS. 5 and 6 supports a substrate 88 which is preferably in the nature of a flat rigid plate having smooth parallel uppermost and lowermost surfaces. The board 16 may be used to positively hold the substrate 88 in place by drawing a vacuum on the substrate 88 through the openings 18. It is to be understood, however, that the substrate 88 may be held on the board 16 in any other suitable manner such as by use of clamps (not shown). Moreover, the board 16 may be entirely eliminated and the substrate 88 firmly attached to the surface 14 of base 12.

Assuming all of the component parts thus far described to have been assembled, clamped and otherwise held in place, as illustrated in FIGS. 1 and 2 of the drawings, the apparatus is now ready for use in the molding of three-dimensional objects. With the assembly 62 disposed at either end of its reciprocable path of travel, it is seen in FIGS 1 and 2 that the squeegee element 68, and particularly the rib 74 if used, will directly engage the upper surface of the member 50, flexing it downwardly toward the substrate 88 both longitudinally as shown in FIG. 1 and transversely as shown in FIG. 2. Prior to commencement of the movement of the assembly 62 toward the opposite end of its path of travel along the arm 30, a supply of molding material 90 is fed in any suitable manner onto the upper surface of the member 50 ahead of the squeegee 68 and directly within its path of travel. As the squeegee 68 approaches the proximal end of the mold 56 it will cause the flexible mold 56 to move into firm engagement with the substrate 88, progressively closing the perforation 58 therebeneath and presenting a cavity in the mold 56 for reception of the material 90.

Simultaneously with such progressive downward flexure of the member 50 and the mold 56 squeegee 68 will force the material 90 through the member 50 at the perforation 58, depositing the material 90 onto the upper flat smooth surface of substrate 88 within the confines of the perforation 58.

The feeding of the material 90 to the member 50 ahead of the squeegee 68 should of course be controlled within certain limits, making sure that there is always a sufficient supply of the material 90 to completely fill the cavity within mold 56 that is defined by the perforation 58. However, excess material will freely flow laterally in both directions beyond the ends of the squeegee 68 as is evident from FIG. 2. For the most part, however, the material 90 will build up ahead of the squeegee 68 as illustrated in FIG. 6 and such materials 90 as becomes excessive will flow ahead of the squeegee 68 as it is advanced.

It is extremely important that the squeegee 68 be relatively rigid as aforementioned in order to provide a smooth surface 92 for the deposited material 94 constituting the article of manufacture molded by the illustrated apparatus and in accordance with the method of my invention. Moreover, it is to be desired that the surface 92 be substantially parallel with the lower surface of the article 94 that engages the substrate 88 and such is assured by the nature of the squeegee 68 as above described.

It is to be understood that the member 50, particularly when the same takes the form of a screen mesh, has a somewhat irregular upper surface; therefore, such is accommodated by the relatively thin resilient coating on the squeegee 68.

The rib 74 is advantageous from the standpoint of providing a line of concentrated pressure of the squeegee 68 on the member 50 and on the mold 56, thereby assuring positive feed or pressure of the material 90 into the cavity defined by perforation 58 such that the cavity will be completely filled with the material 90 while at the same time maintaining the flat, relatively smooth surface 92 in parallelism with the substrate 88.

As the squeegee 68 advances along the mold 56 to progressively bring it into engagement with the upper surface of substrate 88 and as the material 90 is forced into the cavity of mold 56 as above described, the mold 56 is, at the same time, progressively stripped from the deposited material 94 as illustrated in FIG. 6, leaving material 94 deposited upon the substrate 88 and this is extremely advantageous in that it leaves the finished article with smooth sharp edges throughout the peripheral boundaries thereof conforming exactly to the configuration of the perforation 58 and also conforming precisely with the thickness of the mold 56, it being understood that the thickness of the finished article 94 is predetermined by a preselection of the thickness of the mold 56.

After completion of the cycle the article 94 is removed and heat cured in any suitable manner. On the return stroke of the assembly 62 the next successive article 94 is molded in the same manner.

Figure 4:
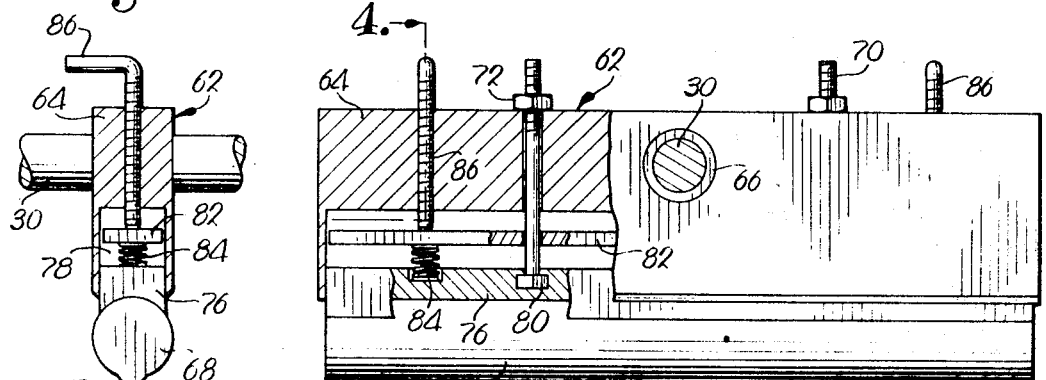
FIG. 4 is a fragmentary, detailed cross-sectional view taken on irregular line 4—4 of FIG. 3 looking in the direction of the arrows.

It is to be noted, particularly in FIGS. 3 and 4, that the springs 84 impart a yieldable bias on the squeegee 68 so as to maintain a full engagement of the mold 56 with the substrate 58 as the squeegee is advanced. Moreover, by adjustment of the stops 86 within the block 64 it is possible to control the amount of material 90 that is pressed into the cavity of mold 56, thereby assuring the operator that such cavity is always completely filled without any excessive buildup of the material 90 above the mold 56 and therefore above the flexible member 50. Still further, in the event that molds 56 are employed which do not have planar, parallel top and bottom surfaces (as for example when the finished product is to have areas of differing thickness), the springs 84 will accommodate the necessary, slight vertical movement of the squeegee 68 as it is advanced.

Another important feature and adaptation of the apparatus and method just above described is its use in the production of finished articles having various designs embossed into or raised upon the surface 92 of the article 94.

After the first pass of the squeegee 68 utilizing the mold 56, the frame 42 is entirely removed from within the frame 20 by releasing latch 38 and the frame 42 is replaced with another frame 42 having a mold 56 provided with a perforation 58 of a differing configuration.

Additionally, adjustment is made to raise the squeegee 68 through use of bolts 70 and nuts 72 with the stops 86 backed off accordingly. Thereupon on the next pass of the squeegee 68 across the new mold 56 a top layer of material 90 is placed upon the previously deposited material 94, presenting a raised design or configuration thereon, it being understood that the material shall be of such nature as to bond together into a composite unit during subsequent curing.

Still further, unique appearances and useful articles can best be produced by utilizing differing colors in the two or more layers of material that are molded into place during successive operations as just explained.

Alternately, in lieu of removal of the frames 42 and replacement with successive frames 42 it might be still more advantageous to provide a series of molding assemblies each having a frame 42 with a mold 56 of a characteristic shape in its perforation 58. In such event after forming the first layer in the first of such assemblies as illustrated in FIG. 6 such first layer and/or the substrate 88 with the layer thereon would be removed and transferred to the second molding unit for the purpose of depositing the second layer. Such steps could be continued until the desired number of layers of material are provided in the finished article.

Still another adaptation is to provide a pocket of a desired shape and size in the finished article. This could be done by placing a blocking agent on the first layer at a desired location thereon prior to placement of the next successive layer, such blocking agent serving to prevent formation of the material within the zone of such agent.

The blocking agent, as for example polyvinyl alcohol, may be placed on the first layer through use of a mold 56 in the same manner as above described. When the third layer is molded into place, the blocking agent will prevent bonding at the zone of the blocking agent, presenting the aforementioned pocket, the latter of which may have an access or entrance mouth at one edge of the finished article, all as preselected through choice of the proper mold 56 used during placement of the blocking agent.

Another manner of providing an opening through the finished article is to utilize at the outset for the material 90 a preselected vinyl plastisol but prior to placement of such material 90 onto the substrate 88 a preselected area on substrate 88 is provided with a contaminant capable of blocking the flow of the vinyl plastisol to the area containing the contaminant. Such contaminant may be in the form of liquid silicone operating to prevent wet-out of the vinyl plastisol on the substrate 88 in the area or areas where the contaminant is initially placed on the substrate 88.

It is to be understood at this juncture that in carrying out the method of my invention, a wide variety of materials 90 may be employed. For example, it is contemplated that in certain instances a moldable liquid will be used and the rheology thereof will be carefully controlled such as by use of silica gel therein.

The rheology of the moldable liquid may also be controlled with synthetic cells such as glass microballoons. It is to be understood further that the completed article may have a cellular structure imparted thereto by use of a blowing agent in the material 90, such as air or a gaseous substance, e.g., nitrogen.

In the event a latex is employed for the material 90, as might be desired in the production of certain three-dimensional articles, it is necessary to give the latex an ionic charge through use of a suitable solvent. Moreover, the substance 88 should also be coated with a substance having an ionic charge, such charge being opposite to that of the latex material. When these procedures are followed, the latex is caused to coagulate during the placement on the substrate 88, giving this material 90 adequate body to form the desired finished product.

When ceramic clay is used for the material 90, it is necessary to utilize a plaster substrate capable of absorbing the moisture content of the clay material 90.

In all events, if it is desired to provide a somewhat rough and/or irregular surface 92 in the finished article 94, such surface may be provided with a layer of a thermoplastic powder which will bond to the material 90 during curing.

It is to be understood still further that through use of the method and apparatus herein described, it is possible to cause the substrate 88 to become a part of the finished article. In that event, by selection of the desired material in substrate 88 the material 90 can be bonded permanently to the substrate 88.

Figure 8:
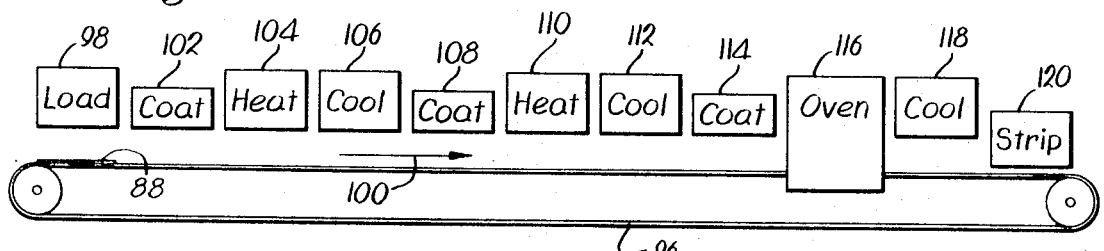
FIG. 8 is a diagrammatical representation of the manner of use of the apparatus while producing the article in large numbers successively.

In FIG. 8 of the drawings there is diagrammatically illustrated a manner of adaptation of the apparatus and method into what might be called an assembly line production. Through use of a continuous conveyor belt 96 successive substrates 88 are placed upon the upper stretch of the conveyor 96 at "load" zone 98 for movement in the direction of arrow 100. When the substrate 88 reaches the "coat" zone 102, a layer 94 of material 90 is deposited upon the substrate 88 through use of one of the assemblies shown in FIGS. 1 and 2.

The substrates 88 with its deposited layer thereon then advances to a "heat" zone 104 for curing purposes and thence to a "cool" zone 106.

The zones 104 and 106 are exemplary only and utilized only when the nature of the material 90 is such as to require curing through use of heat followed by the desired cooling step.

In any event the steps 104 and 106 would normally be employed where it is necessary to gel or partially solidify or cure the first layer 94.

The substrate 88 with the solidified layer 94 thereon then passes to a second "coat" zone 108 for placement of a second layer in the manner above described. Here again, the second layer may pass through "heat" zone 110 and "cool" zone 112 before advancing to a third "coat" zone 114 for the purpose of placement of a third layer. At this juncture, assuming that a desired number of layers are molded in place, the article manufactured advances to an oven 116 for final curing. After cooling in zone 118, the finished article is stripped from the substrate 88 at zone 120.

It is contemplated that FIG. 8 illustrates a continuous process wherein successive substrates 88 are placed on the conveyor 96 in timed sequence so that the finished articles will emanate from the conveyor 96 on a large scale production basis.

It is necessary when molding articles of successive layers of material 90 that the multitude of differing molds 56 be relatively oriented so that the designs or configurations are properly located in accordance with the desires of the manufacturer. For example, the second layer may take the form of lettering, a representation of a building, scenery, the outline of an animal or the like, an infinitum. In some instances such configurations will be centered on the face 92; in other instances they will be offset, as for example adjacent one edge or corner of the initial layer 94.

Figure 9:
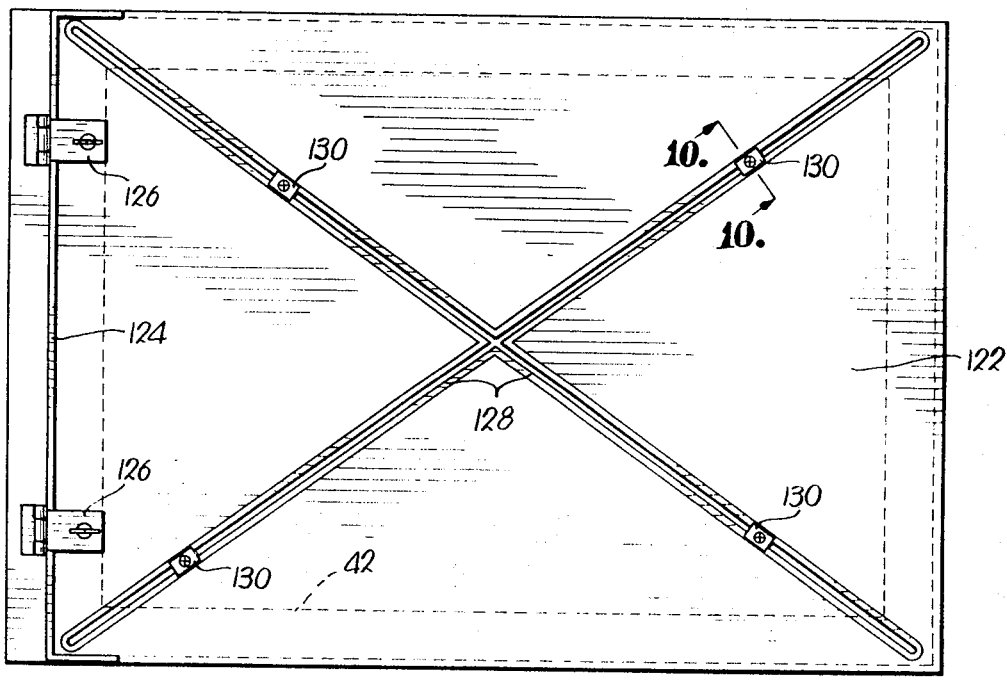
FIG. 9 is a plan view of the screen registry board employed when multilayer articles are to be produced.
Figure 10:
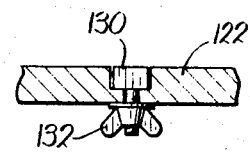
FIG. 10 is a fragmentary detailed cross-sectional view taken on line 10—10 of FIG. 9.

Such proper orientation of the successive molds 56 may be accomplished through use of the device illustrated in FIGS. 9 and 10 of the drawings. A panel 122 is provided with an L-shaped locating flange 124 for receiving frame 42 resting on the upper face of panel 122. Releasable clamps 126 on the panel 122 are employed to properly hold the frame 42 in place.

The panel 122 is provided with a pair of diagonal slots 128 each of which is in turn provided with shiftable registration blocks 130 that are releasably held in place by bolt and nut means 132.

In registering a series of frames 42 each having flexible members 50 joined thereto with stencil molds 56 affixed to the members 50, the original art work (not shown) from which the stencil molds 56 are to be cut is placed on panel 122 and blocks 130 are moved in slots 128 until they are in alignment with four spaced points on the original art work. A suitable marking material such as artist's type is placed on the exposed surface of blocks 130 in order that the location of the blocks 130 may be recorded as "registration marks" on the original art work. The first stencil mold 56 is formed using conventional techniques, e.g., a photographic emulsion, to give a perforation 58 duplicating a portion of the original art work.

The location of blocks 130, recorded as "registration marks" on the original art work, is transferred to the first stencil mold 56. The mold 56 is then placed on panel 122 carefully aligning the marks on the mold 56 with the blocks 130. Frame 42 is mounted on panel 122 using clamps 126 as illustrated in FIG. 9. It is to be understood that the inside dimensions of flange 124 must conform to the outside dimensions of frame 42 in order to insure proper registration of a series of molds 56. Flexible member 50 (omitted in FIG. 9 for purposes of illustration) affixed to frame 42 is joined to the previously registered stencil mold 56 using a suitable adhesive. The above procedure, commencing with the transfer of the "registration marks" to the stencil mold 56 is then repeated for each stencil mold 56 which is to have a perforation 58 forming a part of the original art work. This procedure will insure that all of the stencil molds 56 forming a part of a single piece of original art will be in proper alignment when placed in the apparatus illustrated in FIGS. 1 and 2.

Having thus described the invention, what is claimed as new and desired to be secured by Letters Patent is:

1. A method of making a three-dimensional object having a thickness at least as great as that of a flexible perforated stencil mold and a configuration conforming to the shape of the perforation of the mold, said method comprising the steps of:
    supporting the mold in spaced, overlying relationship to a stationary substrate;
    advancing an elongated rigid squeegee element relative to the mold and the substrate from one end to the opposite end of the mold with said element traversing the mold thereabove;
    pressing said element toward the substrate during advancement of the element to flex the mold downwardly against the substrate throughout the length of the element across the mold to progressively bring the mold into line contact with the substrate beneath the element whereby said line contact advances from said one end to said opposite end of the mold during said advancement of the element; and
    placing a moldable material on the mold across the perforation thereof ahead of said element whereby the material is forced into the perforation by the element at said line contact during advancement of the element;
    said support for the mold being disposed peripherally of the mold and spaced outwardly of its perforation whereby the mold automatically rises away from the substrate behind said element, commencing at said one end of the mold, and is gradually and immediately stripped from the material on the substrate behind the element as the latter is advanced, leaving the material on the substrate.

2. A method according to claim 1, wherein said mold is suspended above the substrate by a peripherally supported, flexible member with the mold interposed between the member and the substrate and secured to the member.

3. A method according to claim 4, wherein said member is a mesh material affixed to the mold thereabove in covering relationship to said perforation,
    said element engaging the member during advancement of the element,
    said element forcing the material through the mesh of said member at the perforation during the pressing and advancing steps.

4. A method according to claim 1, wherein said step of bringing the mold into line contact with the substrate and simultaneously forcing material into the perforation is repeated with materials capable of chemical bonding and with successive molds having perforations of differing configurations.

5. A method according to claim 4, wherein is included the step of depositing a quantity of polyvinyl alcohol at a preselected area between said materials to partially block chemical bonding therebetween, presenting a pocket in said object.

6. A method according to claim 1, and permanently bonding the material to said substrate.

7. A method according to claim 1, wherein said material is vinyl plastisol.

8. A method according to claim 9, wherein prior to said forcing step the substrate is contaminated in designated areas to block the flow of said material to said areas.

9. A method according to claim 8, wherein said step of contaminating said substrate includes depositing liquid silicone on said areas.

10. A method according to claim 1, wherein said material is a moldable liquid having the rheology thereof controlled with silica gel.

11. A method according to claim 1, wherein said material is a moldable liquid having the rheology thereof controlled with synthetic cells.

12. A method according to claim 11, wherein said synthetic cells include glass microballoons.

13. A method according to claim 1, wherein said material includes a blowing agent to impart to cellular structure to said object.

14. A method according to claim 13, wherein said blowing agent includes air.

15. A method according to claim 1, wherein said material is a latex and wherein said material is given an ionic charge, and wherein the substrate is coated with a substance having an ionic charge to place an opposite charge on the substrate.

16. A method according to claim 1, wherein said material is ceramic clay and wherein said substrate is a plaster.

17. A method according to claim 1, wherein said material includes thermoplastic powder.

References Cited
UNITED STATES PATENTS

| | | | |
|---|---|---|---|
| 1,751,430 | 3/1930 | Thomson | 264—310 X |
| 2,404,073 | 7/1946 | Karfiol | 264—132 X |
| 2,430,534 | 11/1947 | Rodli | 264—132 X |
| 2,900,663 | 8/1959 | Linhorst | 264—294 |
| 3,267,191 | 8/1966 | Williams | 264—313 X |
| 3,322,871 | 5/1967 | Noack | 264—104 |
| 3,434,862 | 3/1969 | Luc | 264—214 X |

ROBERT F. WHITE, Primary Examiner

R. R. KUCIA, Assistant Examiner

U.S. Cl. X.R.

264—259, 313; 117—38